United States Patent [19]

Hsieh

[11] Patent Number: 5,120,688
[45] Date of Patent: * Jun. 9, 1992

[54] PRESSURELESS SINTERED SILICON NITRIDE-BORON NITRIDE COMPOSITE

[75] Inventor: Martin Y. Hsieh, Palo Alto, Calif.

[73] Assignee: The Morgan Crucible Company plc, Windsor, England

[*] Notice: The portion of the term of this patent subsequent to Jul. 9, 2008 has been disclaimed.

[21] Appl. No.: 529,816

[22] Filed: May 29, 1990

[51] Int. Cl.$^5$ .............................................. C04B 35/58
[52] U.S. Cl. ........................................ 501/98; 501/96; 501/97
[58] Field of Search .............................. 501/98, 97, 96

[56] References Cited

U.S. PATENT DOCUMENTS

| | | | |
|---|---|---|---|
| 3,833,389 | 9/1974 | Komeya et al. | 501/96 |
| 4,540,674 | 9/1985 | Watanabe et al. | 501/98 |
| 4,943,543 | 7/1990 | Ingelstrom | 501/98 |
| 5,030,598 | 7/1991 | Hsieh | 501/97 |

*Primary Examiner*—William R. Dixon, Jr.
*Assistant Examiner*—Sue Hollenbeck
*Attorney, Agent, or Firm*—Kilpatrick & Cody

[57] ABSTRACT

A pressureless sintered silicon nitride-boron nitride composite having high density and low elastic modulus has a composition of 2 to 30 wt. % boron nitride and 70 to 98% of a blend of yttrium oxide, aluminum nitride and silicon nitride.

9 Claims, No Drawings

PRESSURELESS SINTERED SILICON NITRIDE-BORON NITRIDE COMPOSITE

This invention concerns silicon aluminum oxynitride materials, commonly referred to as sialons. Examples thereof are shown in U.S. Pat. No. 4,873,210 and patents cited therein.

This invention particularly concerns silicon nitride articles that can be pressureless sintered to a high density and which have a reduced elastic modulus for improved thermal shock resistance.

I have found that boron nitride can be blended with silicon nitride, aluminum nitride and yttrium oxide to yield a silicon nitride-boron nitride composite which can be pressureless sintered to a high density at least 93% of theoretical density and which has a low elastic modulus for improved thermal shock resistance. The composition of the composite is 70 to 98 wt. % of a blend of yttrium oxide, aluminum nitride, silicon nitride and 2 to 30 wt. % boron nitride. The boron nitride may be mixed with the unsintered or sintered blend of aluminum nitride, yttrium oxide, silicon nitride.

If aluminum oxide is used instead of aluminum nitride, there is little shrinkage during sintering and the material does not sinter to a sufficiently high density.

The preferred composition of the blend is 6.2 to 6.4 wt. % yttrium oxide, 10 to 12.5 wt. % aluminum nitride, balance silicon nitride. The preferred composition of the composite is 80 to 90 wt. % of this blend and 10–20 wt. % boron nitride.

EXAMPLE 1

A blend was made of 6.4 wt. % yttrium oxide, 10.4 wt. % aluminum nitride, 83.2 wt. % silicon nitride. Three samples were prepared from this blend, Sample A containing 96 wt. % blend, 4 wt. % boron nitride, Sample B containing 90 wt. % blend, 10 wt. % boron nitride, Sample C containing 85 wt. % blend, 15 wt. % boron nitride. After the samples were thoroughly mixed and milled, and pressed into a proper shape, they were pressureless sintered in a silicon nitride crucible under one atmosphere nitrogen for four hours at 1780° C. The sintered densities of Samples A, B and C were, respectively, 3.150, 2.976 and 2.868 gm/cc. The theoretical density of boron nitride is only 2.28. Thus an increased concentration of boron nitride lowers the sintered density of the silicon nitride-boron nitride composite.

EXAMPLE 2

A blend was made of 6.2 wt. % yttrium oxide, 12.5 wt. % aluminum nitride, 81.3 wt. % silicon nitride. Four samples were prepared from this blend, Sample D containing 96 wt. % blend-4 wt. % boron nitride, Sample E containing 90 wt. % blend-10 wt % boron nitride, Sample F containing 85 wt. % blend-15 wt % boron nitride, Sample G containing 80 wt % blend-20 wt. % boron nitride. The samples were processed similar to those of Example 1. The sintered densities of Samples D, E, F and G were, respectively, 3.170, 3.032, 2.895 and 2.775 gm/cc.

EXAMPLE 3

Four samples H, I, J and K were prepared similar and corresponding to those of Example 2 except that sintering was at 1760° C. instead of 1780° C. The sintered densities of Samples H, I, J and K were, respectively, 3.161, 3.021, 2.884 and 2.754 gm/cc.

EXAMPLE 4

A blend was made of 6.2 wt. % yttrium oxide, 12.5 wt. % aluminum nitride, 81.3 wt. % silicon nitride. The blend was sintered at 1300° C. for four hours under one atmosphere nitrogen to form a sialon which was then pulverized, mixed and milled with boron nitride as follows. Sample L contained 90 wt. % sialon-10 wt. % boron nitride. Sample M contained 85 wt. % sialon-15 wt. % boron nitride. Sample N contained 80 wt. % sialon-20 wt. % boron nitride. After the samples were pressed into a proper shape, they were pressureless sintered in a silicon nitride crucible under one atmosphere nitrogen for four hours at 1780° C. The sintered densities of Samples L, M and N were, respectively, 3.040, 2.981 and 2.736 gm/cc.

Elastic modulus was measured on a pressureless sintered sialon made of 6.2 wt. % yttrium oxide, 12.5 wt. % aluminum nitride, 81.3 wt. % silicon nitride. The elastic modulus was $46.5 \times 10^6$ psi.

The elastic modulus for silicon nitride-boron nitride composites made from the same blend but containing boron nitride was as follows.

| SAMPLE | COMPOSITION | ELASTIC MODULUS |
| --- | --- | --- |
| D | 96 wt. % blend-4 wt. % BN | $41.9 \times 10^6$ psi |
| E | 90 wt. % blend-10 wt. % BN | $34.5 \times 10^6$ psi |
| G | 80 wt. % blend-20 wt. % BN | $21.2 \times 10^6$ psi |

It can be seen that increased boron nitride significantly reduces elastic modulus, the 20% BN sample being about half that of the 4% BN sample. The 4% BN sample was about 10% less than that of the sample without boron nitride.

Pressureless sintered silicon nitride-boron nitride composites as per this invention are especially satisfactory as crucibles for sintering silicon nitride. Crucibles of 50 ml capacity were made from mixtures corresponding to Sample E (90 wt. % blend-10 wt. % boron nitride) and Sample G (80 wt. % blend-20 wt. % boron nitride). The crucibles were dry bag pressed at 8000 psi and then sintered at 1760° C. for four hours. The sintered densities were, respectively, 3.014 and 2.697. The crucibles withstood twenty cycles of sintering silicon nitride bodies at temperatures between 1700° and 1800° C. without cracking or other damage. An advantage of these crucibles is that they can withstand overheated furnace temperatures as high as 1900° C. without damage.

I claim:

1. A pressureless sintered silicon nitride-boron nitride composite having at least 9390 theoretical density and low elastic modulus, the composition of the composite being 2 to 30 wt. % boron nitride and 70 to 98% of a blend of yttrium oxide, aluminum nitride and silicon nitride.

2. The composite of claim 1 wherein the composition of the blend is 5 to 7 wt. % yttrium oxide, 9 to 13 wt. % aluminum nitride, balance silicon nitride.

3. The composite of claim 1 wherein the composition of the blend is 6.2 to 6.4 wt. % yttrium oxide, 10 to 12.5 wt. % aluminum nitride, balance silicon nitride.

4. The composite of claim 3 wherein the composition of the composite is 10 to 20 wt. % of boron nitride and 80 to 90 wt. % of the blend of yttrium oxide, aluminum nitride and silicon nitride.

5. The composite of claim 1 made by mixing the boron nitride with the blend of yttrium oxide, aluminum nitride and silicon nitride, the blend being in an unsintered state, milling the mixture of boron nitride and blend, pressing the mixture into a suitable shape, and pressureless sintering the pressed shape to form the composite.

6. The composite of claim 1 made by sintering the blend of yttrium oxide, aluminum nitride and silicon nitride to form a sialon, pulverizing the sialon and then mixing and milling it with the boron nitride, pressing the mixture into a suitable shape, and pressureless sintering the pressed shape to form the composite.

7. A pressureless sintered silicon nitride-boron nitride crucible having a composition consisting of 80 to 90 wt. % of a blend of yttrium oxide, aluminum nitride and silicon nitride and 10 to 20 wt. % boron nitride, the crucible suitable for sintering silicon nitride bodies and capable of withstanding temperatures of 1900° C. without damage.

8. The method of making a silicon nitride-boron nitride crucible comprising the steps of preparing a mixture consisting of 10 to 20 wt. % boron nitride and 80 to 90 wt. % of a blend of yttrium oxide, aluminum nitride and silicon nitride, dry bag pressing the mixture into the shape of a crucible and pressureless sintering the crucible at a time and temperature sufficient to attain at least 93% of theoretical density.

9. The method of claim 8 wherein the mixture is dry bag pressed at 8000 psi and the crucible is sintered at 1760° C. for four hours.

* * * * *

UNITED STATES PATENT AND TRADEMARK OFFICE
CERTIFICATE OF CORRECTION

PATENT NO. : 5,120,688

DATED : June 9, 1992

INVENTOR(S) : Martin Y. Hsieh

It is certified that error appears in the above-identified patent and that said Letters Patent is hereby corrected as shown below:

```
    Column 2, line 54, delete "9390" and insert --93%--
    therefor
```

Signed and Sealed this

Twentieth Day of September, 1994

Attest:

BRUCE LEHMAN

Attesting Officer

Commissioner of Patents and Trademarks